United States Patent

Cicatelli

[11] 4,128,015
[45] Dec. 5, 1978

[54] DEVICE FOR THE STORAGE OF POWER AND ITS CONTROLLABLE, SLOW RATE RELEASE

[75] Inventor: Rodolfo Cicatelli, Lugano, Switzerland

[73] Assignee: Autovox, S.p.A., Rome, Italy

[21] Appl. No.: 765,024

[22] Filed: Feb. 2, 1977

[30] Foreign Application Priority Data

Feb. 2, 1976 [IT] Italy .............................. 47899 A/76

[51] Int. Cl.² .......................................... F16H 27/02
[52] U.S. Cl. .................................. 74/89.17; 185/40 R
[58] Field of Search ................. 74/89.17; 185/40 R, 185/11; 58/23 D, 111, 121 R, 125 B, 125 C

[56] References Cited

U.S. PATENT DOCUMENTS

| 3,080,017 | 3/1963 | Kent | 185/40 R |
| 3,464,199 | 9/1969 | Scherz | 58/125 |

*Primary Examiner*—Samuel Scott
*Assistant Examiner*—James Yates
*Attorney, Agent, or Firm*—James W. Gillman; Phillip H. Melamed

[57] ABSTRACT

A device for storing power and providing for the controllable slow rate release of the stored power is provided. The device comprises a wheelwork fulcrumed to and carried by a pivotal lever, wherein the wheelwork is alternately operated by a motor driven pinion and by an energy storage member.

10 Claims, 3 Drawing Figures

U.S. Patent     Dec. 5, 1978     4,128,015

# DEVICE FOR THE STORAGE OF POWER AND ITS CONTROLLABLE, SLOW RATE RELEASE

It is known that in many cases it is required to store power, and this power be slowly and gradually released, upon actuating a control therefor.

Substantially and particularly in the field of the tape recorders, the above mentioned servomechanism utilizes a motor loading an elastic body, such as a spring for example, which upon being controlled releases the stored power to be used for example for the ejection of a cassette out from a tape recorder.

The problem of this servomechnism is to provide coupling with the motor only during the spring preloading period; at the end of said preloading, the coupling with the motor or with the member driven by the motor, is to be removed, and the motor has to work for driving the main member (e.g. the tape of the recorder) with no other impediments; then, with or without power supply, the servomechanism has to release the power stored therein, but slowly, and thus the power releasing is to be slowed down. At the end of said power releasing, there is to be established a reengagement condition for the next sequence.

SUMMARY OF THE INVENTION

Such configuration of the servomechanism, in itself already known, particularly as regards dimensions, efficiency, gear ratios, reliability, is in fact a rather complicated problem. The object of this invention is to provide a mechanism operating for the coupling with the power take-off, in particular with a toothed pinion; the loading of a spring; the automatic disengagement, at the end of the spring loading, from said toothed pinion; the locking of the releasing means so that, in a rest condition, the spring remains loaded, and then, when desired, upon applying a control or automatically, a slow release of the stored power is obtained.

The device according to this invention substantially consists of storage means, such as a spring, coupled with a driving member, such as a rack; a wheelwork, alternately driven by a motor and by the storing member; a lever fulcrumed to one of the wheelwork gears, and oscillating between two fixed positions, by means of a chronometer escapement means.

BRIEF DESCRIPTION OF THE DRAWINGS

The device of this invention will be better understood through a reading of the following description with reference to the accompanying drawing, wherein an embodiment of the device of this invention in three positions is schematically illustrated, by way of example.

In the drawings.

DESCRIPTION OF THE PREFERRED EMBODIMENT

Figure 1:
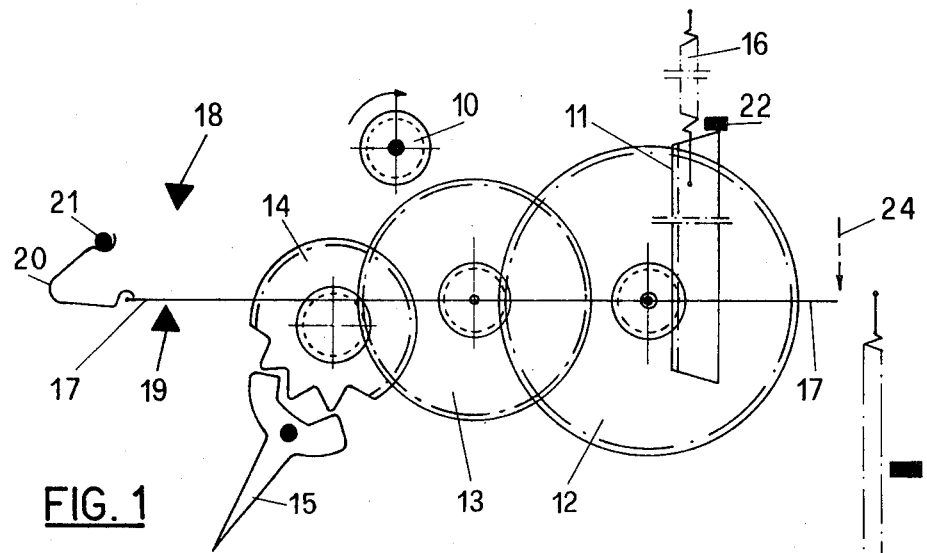
FIG. 1 shows the device of this invention in a rest position, with the storage member being in a rest position.

With reference to the drawing, the device appears substantially consisting of a power take-off toothed pinion 10; a rack 11 which, during its displacement drives a spring 16; a wheelwork 12, 13 and 14; a small anchor 15, a flip-flop 20; and a lever 17.

The rack 11 has two detents 22 and 23, and the flip-flop 20 has a pin 21 and two detents 18, 19. The detents 18, 19, the fulcrum 21 of the flip-flop, the detents 22, 23 of the rack, the pin of the pinion 10, and the fulcrum of lever 17, as well as the small anchor 15 and the coupling of spring 16 are all related to the frame on which the device is mounted. The lever 17 is fulcrumed about the axis of the toothed wheel 12, and carries fulcrumed thereon the toothed wheel 13 and the star-like radial wheel 14. The reason for this arrangement will be seen later.

Figure 2:
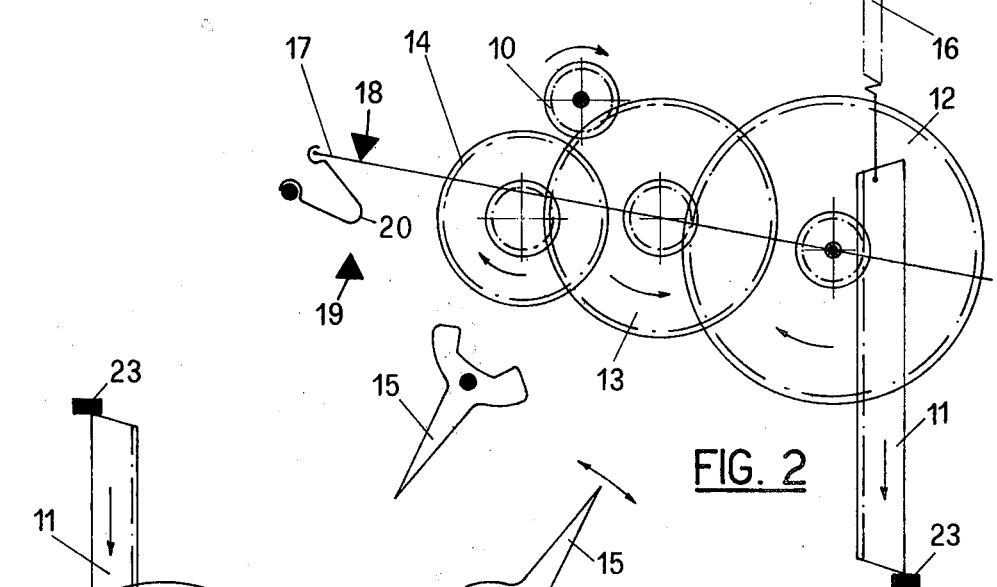
FIG. 2 shows the device while loading the storage member.

Starting from the position illustrated in FIG. 1, that is to say with the device in a rest condition, the power take-off 10 works freely and has no connection with the loading system, the spring 20 holds the lever 17 against the detent 19, thereby assuring the whole system release. Assuming that by means of a control, schematically indicated by an arrow 24, which simulates the coupling thrust, one acts upon the lower arm of the lever 17, one operates by shifting from the position shown in FIG. 1 to the position shown in FIG. 2. It is to be noted that, in this position, the bistable 20, thus operating, urges the lever 17 towards the detent 18. The pinion 10 then comes into contact, or better, into a gearing engagement with the toothed wheel 13, inasmuch as both wheels 13 and 14 are carried by the lever 17. The movement of the lever 17 then causes the wheels 13, 14 to rotate angularly, producing the coupling of the toothed wheel 13 with the pinion 10. As a result, wheels 12, 13 and 14 move in the directions shown in FIG. 2 by the respective arrows. It is to be outlined that wheel 14, in this condition is idly rotating, whereas wheel 13, which receives its movement from the pinion 10, drives the toothed wheel 12, which, in turn, drives the rack 11, thereby loading the spring 16.

When the rack reaches the end of its stroke, such as the stop 23, or particularly an obstacle, an overload or other, so as to cause an unbalance, the wheel 12 can no longer turn and then the torque that the pinion 10 transfers to the wheel 13 constrains the latter to roll along the periphery of the wheel 12. As a result of this rolling, the lever 17 moves angularly and displaces therewith also the toothed wheel 14. When the whole assembly has reached a given position, whereby the teeth of the toothed wheel 13 clear off the teeth of the toothed pinion 10, the lever 17 has thus passed the center line of the flip-flop 20, whereby lever 17 itself, due to the actuation of the flip-flop 20 moves independently from the motion drive by the pinion 10 so as to reach the second position of the bistable 20 defined when the lever 17 abuts against the detent 19.

Figure 3:
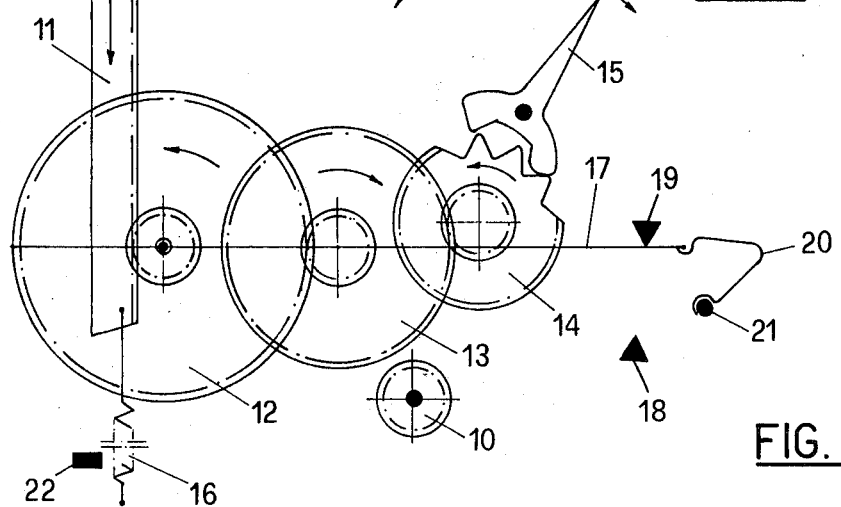
FIG. 3 shows the device in a rest position, with the storage member loaded.

Now we are in the position particularly illustrated in FIG. 3.

As it can be seen, in the loading position, the several parts forming the device are almost in the position illustrated in FIG. 1, except that spring 16 is now completely loaded and the rack 11 abuts against the stop 23. Then, in the position shown in FIG. 3, there are established some torques indicated by the respective arrows. This means that now the disposition of the device is the same as the geometrical disposition of the position shown in FIG. 1, but this is a completely different kinematic position. At this point it is to be noted that the star-like wheel 14 is engaged with the anchor 15, and if the anchor is locked either by the mechanical system or by an electromechanical means, the spring 16 is still tensioned and the system cannot be released. Moreover, since from the rack 11 to the star-like wheel 14 there is a wheelwork 12, 13, 14, the locking torque of the system is greatly reduced, whereby the anchor 15 can be locked with a minimum force, and this is very advantageous for the relay that should pilot it, if necessary. The situation illustrated in FIG. 3 remains stable until the time when, due to the actuation of a manual control or by means of an interlocked system, the holding relay, not shown in the drawings, releases the anchor. In the moment when the locking action on the anchor is removed, the latter starts oscillating as a common chronometer escapement system. The power stored by the spring 16 is thus returned back through this escapement system, and therefore slowly and almost constantly until the whole system is released and the rack 11 and spring 16 return back to the position shown in FIG. 1. At this point the device is ready to start a new duty cycle.

As it can be seen from the drawing and the foregoing description, the device is particularly simple, inexpensive, practical and reliable, a transmission being realized thereby in order to bring the torque of the pinion 10 in relation with the bias on the spring 16, namely that one which could be otherwise called a step-up transmission. This step-up transmission, for reasons of locking and release, is again multiplied in order to reduce the necessary effort to hold the anchor 15. This is a particularly important solution to a highly considerable problem, and namely the problem of satisfactorily having a system which could be locked with a minimum of power, and this particularly for tape recorders, inasmuch as the relay must always be kept on during the operation of the tape recorder so that it becomes operative in case of failure of the electric power, it is evident that the load of this relay must be extremely reduced in order to reduce the passive electric energy consumtion.

As it can be seen from the drawing, the lever 17 is indicated in an extremely schematic form, but it is the lever 17 that performs the control for the several components coupled with it.

The device has been essentially shown and described with reference to a preferred embodiment thereof, but it appears evident that some structural type modifications could be made in it as may be dictated by the art and the common practice, without, however, departing from the scope of the invention which is defined by the following claims.

I claim:

1. A device for the storage of power and its controllable, slow rate release, comprising: a storage member coupled to a drive member; a wheelwork alternatively operated by a motor and by the storage member; a lever fulcrumed to at least one wheel of the wheelwork and oscillating between two fixed positions; and an escapement means selectively coupled to said wheelwork; wherein, when said lever is in one of said fixed positions, the wheels of the wheelwork are in meshing engagement with a motor driven wheel and the storage member stores the power transmitted to it, and, when said lever is in said other fixed position, the wheelwork is disengaged from said motor and cooperates with and is coupled to, by movement of said level, one portion of a double-action member of said escapement means for selectively locking and slowly releasing the storage member.

2. The device according to claim 1, wherein said two fixed positions of said lever carrying said wheelwork are defined by a bistable spring means and stops for said lever.

3. The device according to claim 2 wherein the double acting member comprises a star-like wheel supported by the said lever, driven by said wheelwork, and cooperating with a small anchor selectively coupled to said star-like wheel for performing the locking action and carrying out the operation of slowly releasing the stored power from said storage member.

4. The device according to claim 2, wherein the storage member is a spring and the drive member is a rack, the latter operating for loading the spring and releasing the power stored by the spring when the stop constraint of the said double acting member is removed.

5. The device according to claim 4 wherein with said lever in said one position, upon the rack contacting a stop determining the end of its stroke, said motor driven means causes initial pivotal movement of said level and said bistable means subsequently completes the pivotal movement of said lever into said other position.

6. The device according to claim 1 wherein with said lever in said one position, after transmitting power to said storage means, said motor driven means causes movement of said lever to move said lever into said other position, thereby decoupling said wheelwork from said motor.

7. The device according to claim 1 wherein said wheelwork comprises wheel gears and said motor driven wheel comprises a driven pinion.

8. A device for the storage of power and its controllable, slow rate release, comprising: a storage member coupled to a drive member; a wheelwork alternatively operated by a motor and by the storage member; a lever fulcrumed to one of the wheelwork wheels and oscillating between two fixed positions; and an escapement means selectively coupled to said wheelwork, wherein, when said lever is in said one fixed position, the wheels of the wheelwork are meshing with a driving means and the storage member stores the power transmitted to it, and, when said lever is in said other fixed position, the wheels cooperate with a double-action member for both locking and slowly releasing the storage member; and wherein the storage member is a spring and the drive member is a rack, the latter operating for loading the spring and releasing the power stored by the spring when a stop constraint of the said double action member is removed.

9. The device of claim 8 wherein said wheelwork comprises wheel gears and said driving means comprises a driving pinion.

10. The device of claim 9 wherein said two fixed positions of said lever are defined by a bistable means.

* * * * *